| (12) | United States Patent | (10) Patent No.: | US 8,369,455 B2 |
|---|---|---|---|
| | Hasegawa et al. | (45) Date of Patent: | Feb. 5, 2013 |

(54) RECEIVING APPARATUS, RECEIVING METHOD, AND PROGRAM

(75) Inventors: Ryo Hasegawa, Tokyo (JP); Katsumi Takaoka, Chiba (JP)

(73) Assignee: Sony Corporation, Tokyo (JP)

( * ) Notice: Subject to any disclaimer, the term of this patent is extended or adjusted under 35 U.S.C. 154(b) by 904 days.

(21) Appl. No.: 12/482,530

(22) Filed: Jun. 11, 2009

(65) Prior Publication Data

US 2009/0310713 A1    Dec. 17, 2009

(30) Foreign Application Priority Data

Jun. 12, 2008    (JP) .................................. P2008-154034

(51) Int. Cl.
*H03K 9/00*    (2006.01)
*H04L 27/00*    (2006.01)

(52) U.S. Cl. ....................................................... 375/316
(58) Field of Classification Search .................... 375/316
See application file for complete search history.

(56) References Cited

U.S. PATENT DOCUMENTS

| 6,172,862 | B1 * | 1/2001 | Jonnatti et al. ................... 361/78 |
| 6,545,715 | B1 * | 4/2003 | Na ................................ 348/351 |
| 7,719,457 | B1 * | 5/2010 | Tindall ............................. 342/14 |
| 2004/0153894 | A1 * | 8/2004 | van der Valk ................. 714/700 |
| 2012/0092157 | A1 * | 4/2012 | Tran ......................... 340/539.12 |

FOREIGN PATENT DOCUMENTS

| JP | 8 288842 | 11/1996 |
| JP | 2002-94585 | 3/2002 |

* cited by examiner

*Primary Examiner* — Erin File
(74) *Attorney, Agent, or Firm* — Frommer Lawrence & Haug LLP; William S. Frommer; Ellen Marcie Emas

(57) ABSTRACT

The present invention provides a receiving apparatus including: a capturing section configured to correct an error of a receive signal and capture the receive signal; a filtering section configured to remove a low frequency component of a signal indicative of an integrated value of an error of the receive signal; and a capture detecting section configured to monitor a signal outputted from the filtering section and, if the signal is within a predetermined range for a predetermined time, detect that the capturing section has captured the receive signal.

6 Claims, 9 Drawing Sheets

TIMING ERROR

INTEGRATED VALUE

HIGHPASS FILTER OUTPUT

RATE OF CHANGE

LOCK SIGNAL

RECEIVING APPARATUS, RECEIVING METHOD, AND PROGRAM

BACKGROUND OF THE INVENTION

1. Field of the Invention

The present invention relates to a receiving apparatus, a receiving method, and a program and, more particularly, to a receiving apparatus, a receiving method, and a program that are configured to correctly detect the capture of a receive signal.

2. Description of the Related Art

Receiving apparatuses configured to receive digital broadcast and so on must execute, in receiving broadcast waves and digitally demodulating receive signals thereof, timing correction and phase noise correction on the receive signals, for example. Generally, these correction processing operations are seamlessly executed by a correction circuit that is configured to execute automatic control based on control engineering.

For example, FIG. 1 shows a block diagram illustrating a related-art correction circuit.

As shown in FIG. 1, a correction circuit 11 is made up of a correction block 12, an error detector 13, a loop filter 14, an NCO (Numerically Controlled Oscillator) 15, thereby forming a feedback loop.

The correction block 12 is supplied with a receive signal received at a receiving circuit having an antenna, not shown. The correction block 12 executes correction processing for removing an error (a frequency error or a phase error) of the receive signal on the basis of an error correction signal supplied from the NCO 15. Next, the correction block 12 supplied the corrected receive signal to the error detector 13 and, at the same time, outputs the corrected receive signal to a signal processing circuit 21 of a subsequent stage, such as a demodulating circuit or a decoding circuit, for example.

The error detector 13 detects an error of the corrected receive signal supplied from the correction block 12 and supplies the detected error to the loop filter 14. The loop filter 14 filters the error signal supplied from the error detector 13 for smoothing and supplies the smoothed signal to the NCO 15. In accordance with the error signal supplied from the loop filter 14, the NCO 15 controls the oscillation frequency of the error correction signal to be supplied to the correction block 12, generating an error correction signal having an oscillation frequency in accordance with the error.

Then, when the receive signal is corrected in the correction block 12 on the basis of the error correction signal supplied from the NCO 15, the error of the receive signal to be outputted from the correction block 12 is reduced. When the reduced error falls within a predetermined error range, the correction of the receive signal is completed. Namely, the receive signal is captured.

As described above, when a receive signal is captured, the correction circuit 11 goes from the initial capture processing for capturing a receive signal to the synchronization hold processing for holding the synchronization of the captured receive signal. At the same time, in the receiving apparatus, a lock signal indicative that the receive signal has been captured in the correction circuit 11 is supplied to the signal processing circuit 21 of the subsequent stage.

The receiving apparatus shown in FIG. 2 has a lock detector 22 configured to output a lock signal.

In FIG. 2, the lock detector 22 is supplied with an error signal outputted from the error detector 13. The lock detector 22 monitors this error signal and, when the error of the receive signal falls within a predetermined error range, supplies a lock signal indicative of that the receive signal has been captured to the signal processing circuit 21.

For example, timing recovery (or timing correction) is executed by use of an interpolation filter as the correction block 12 and a timing phase error detector as the error detector 13.

FIG. 3 shows a block diagram illustrating an exemplary configuration of a correction circuit 11' configured to execute timing recovery.

In the correction circuit 11', a timing phase error detector 17 detects a timing phase error of a receive signal outputted from an interpolation filter 18 and an error correction signal based on this timing phase error is supplied from an NCO 15 to the interpolation filter 18. Next, in accordance with the error correction signal supplied from the NCO 15, the interpolation filter 18 adjusts the timing of the frequency for sampling the receive signal, thereby correcting the timing deviation of the receive signal. Next, the lock detector 22 monitors the timing phase error outputted from the timing phase error detector 17 and, when the receive signal is captured, supplies the lock signal to the signal processing circuit 21.

Also, Japanese Patent Laid-open No. 2002-94585 discloses a receiving apparatus configured to adjust the gain of a loop filter on the basis of an error detection result of a receive signal, for example.

SUMMARY OF THE INVENTION

In such a receiving apparatus as described above, the processing by the signal processing circuit that is located after the correction circuit is started by a lock signal outputted from the lock detector, so that the lock signal is required for a high reliability, which, in turn, requires the correction detection of the capture of each receive signal.

Therefore, embodiments of the present invention address the above-identified and other problems associated with related-art methods and apparatuses and solves the addressed problems by providing a receiving apparatus, a receiving method, and a program that are configured to correctly detect that a receive signal has been captured.

In carrying out the invention and according to one embodiment thereof, there is provided a receiving apparatus. This receiving apparatus has a capturing section configured to correct an error of a receive signal and capture the receive signal; a filtering section configured to remove a low frequency component of a signal indicative of an integrated value of an error of the receive signal; and a capture detecting section configured to monitor a signal outputted from the filtering section and, if the signal is within a predetermined range for a predetermined time, detect that the capturing section has captured the receive signal.

In carrying out the invention and according to another embodiment thereof, there is provided a receiving method or a program, including the steps of:

correcting an error of a receive signal and capturing the receive signal;

removing a low frequency component of a signal indicative of an integrated value of an error of the receive signal; and monitoring a signal outputted from the filtering step and, if the signal is within a predetermined range for a predetermined time, detecting that the capturing step has captured the receive signal.

In one embodiment of the present invention, the receiving apparatus has a capturing section configured to correct an error of a receive signal to capture this receive signal. Next, the low frequency component of a signal indicative of an integrated value of the receive signal is removed and the signal removed of the low frequency component is monitored. If this signal is within a predetermined range for a time set by a predetermined threshold, that the above-mentioned capturing section has captured the receive signal is detected.

According to one embodiment of the present invention, that a receive signal has been captured can be correctly detected.

DETAILED DESCRIPTION OF THE PREFERRED EMBODIMENTS

This invention will be described in further detail by way of embodiments thereof with reference to the accompanying drawings.

Figure 1:
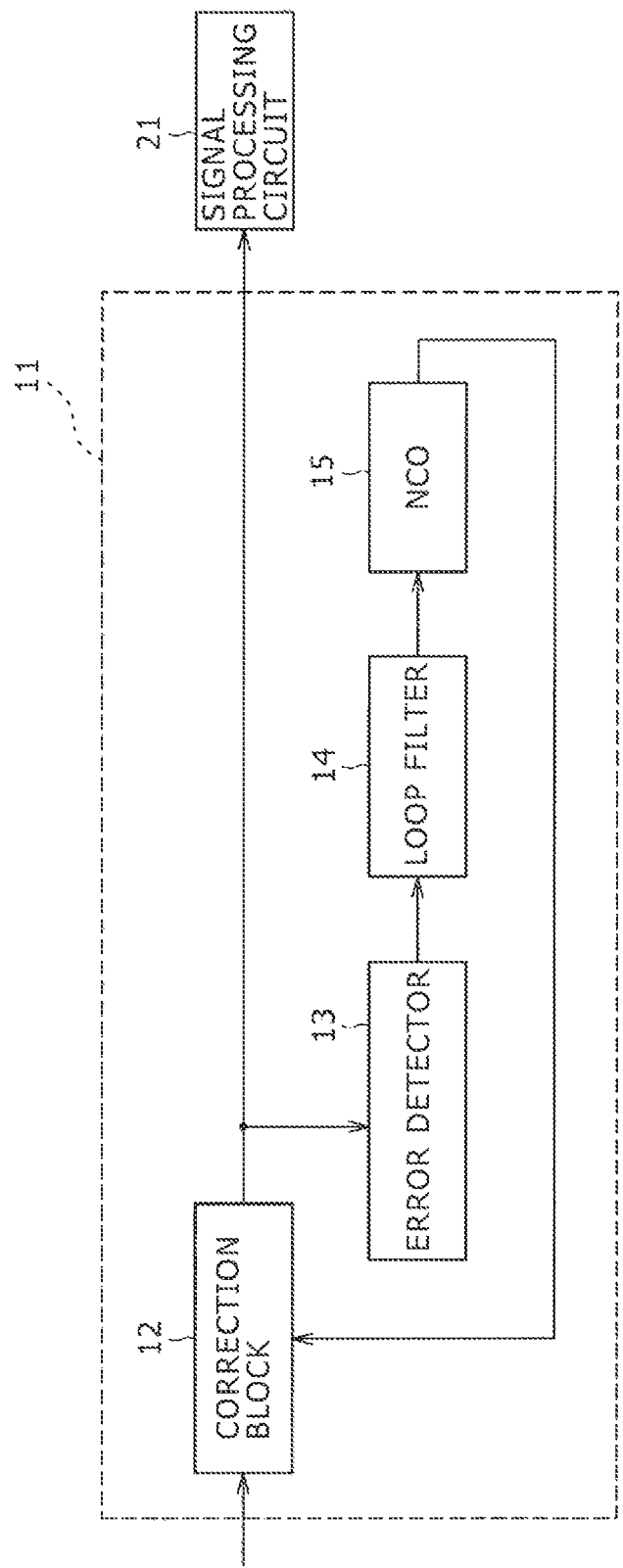
FIG. 1 is a block diagram illustrating an exemplary configuration of a related-art correction circuit.
Figure 2:
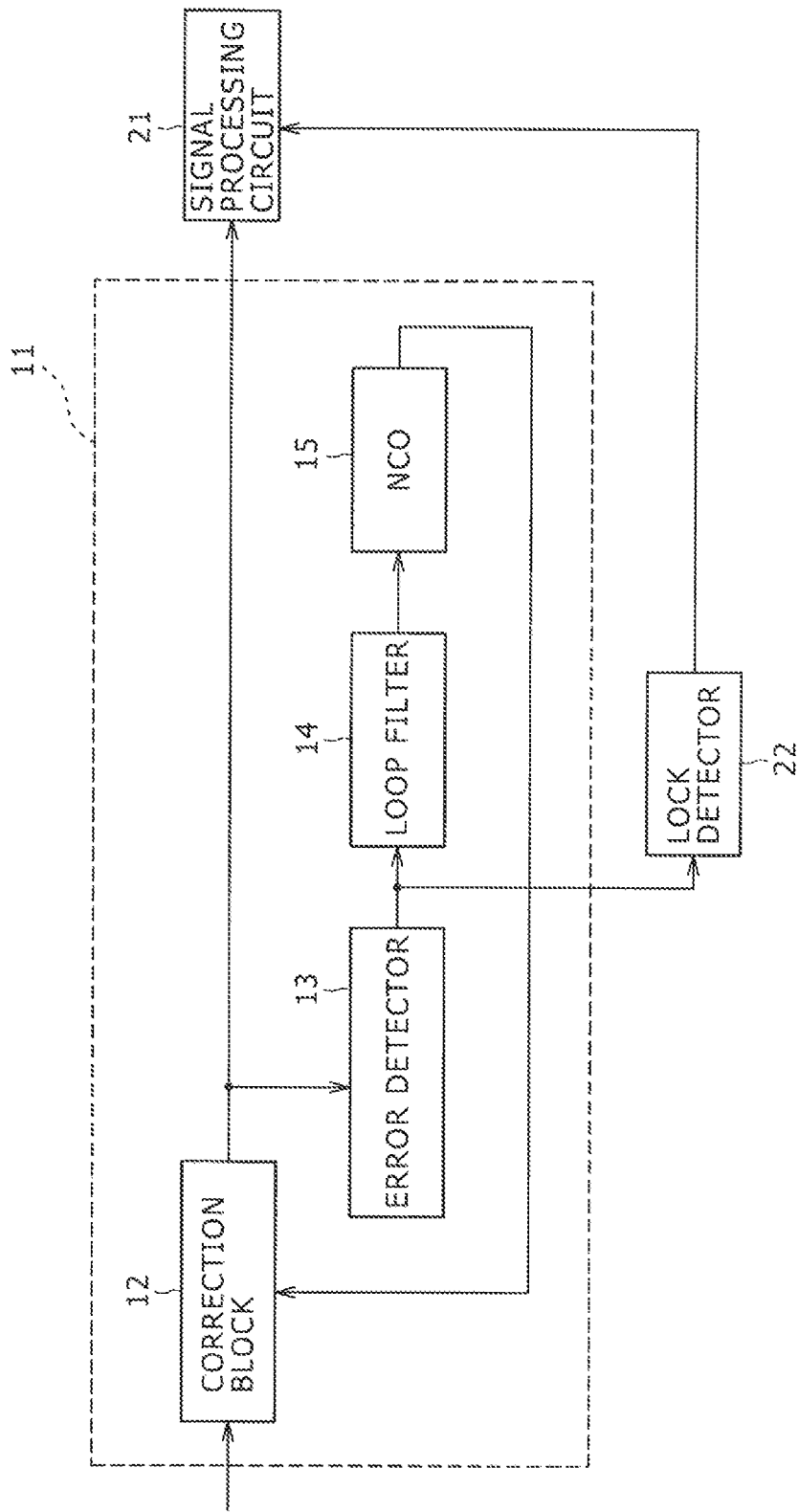
FIG. 2 is a block diagram illustrating an exemplary configuration of a related-art correction circuit.
Figure 3:
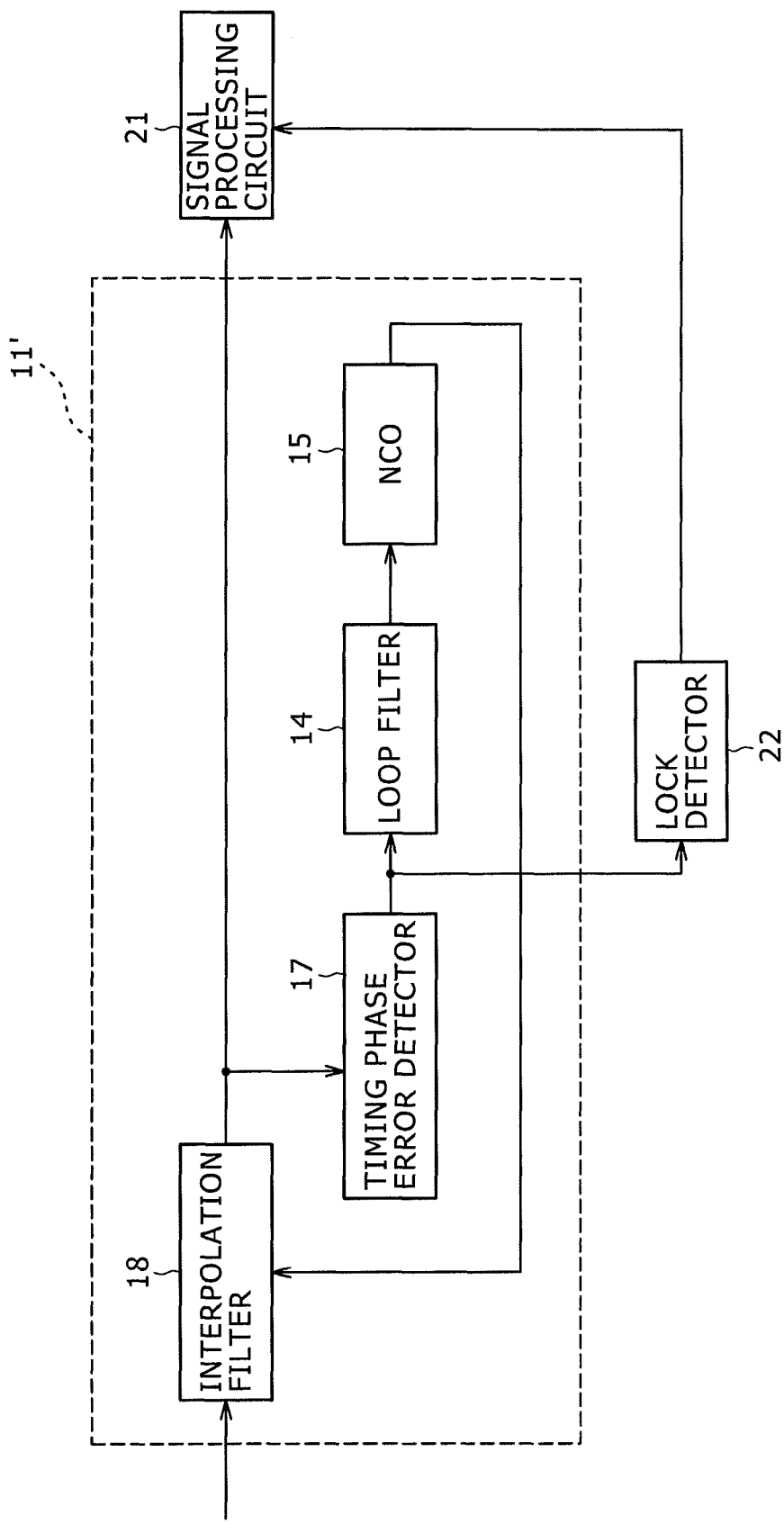
FIG. 3 is a block diagram illustrating an exemplary configuration of a correction circuit configured to executing timing recovery.
Figure 4:
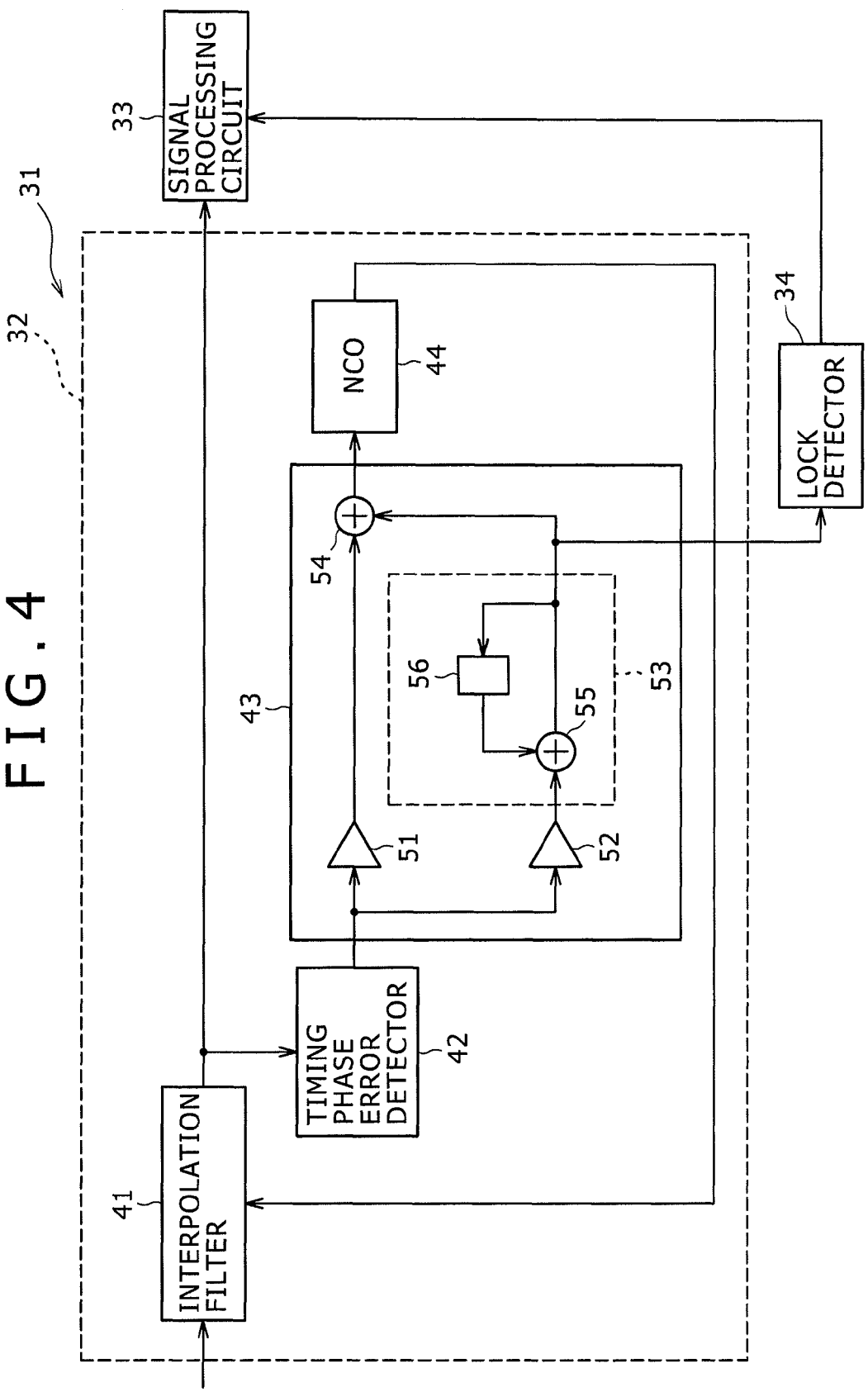
FIG. 4 is a block diagram illustrating an exemplary configuration of a receiving apparatus practiced as one embodiment of the invention.

Now, referring to FIG. 4, there is shown a block diagram illustrating a receiving apparatus 31 practiced as one embodiment of the invention.

As shown in FIG. 4, the receiving apparatus 31 is made up of a timing correction circuit 32, a signal processing circuit 33, and a lock detector 34. The timing correction circuit 32 is made up of an interpolation filter 41, a timing phase error detector 42, a loop filter 43, and an NCO 44.

The interpolation filter 41 is supplied with a signal received by a receiving circuit having an antenna, not shown, and samples the receive signal entered from the receiving circuit by a frequency of a predetermined timing, outputting the sampled signal. Also, the interpolation filter 41 is supplied, from the NCO 44, with an error correction signal for correcting the error of a receive signal outputted from the interpolation filter 41 and adjusts the timing of the frequency for sampling the receive signal in accordance with this error correction signal.

Thus, adjusting the timing of the frequency in accordance with the error correction signal by the interpolation filter 41 corrects the timing deviation of the receive signal outputted from the interpolation filter 41. The interpolation filter 41 supplies the receive signal corrected of the timing deviation to the signal processing circuit 33 and the timing phase error detector 42.

The timing phase error detector 42 detects the timing phase error of the receive signal corrected by the interpolation filter 41 relative to the phase of the timing of a predetermined reference signal for the processing in the receiving apparatus 31 and supplies an error signal indicative of a timing deviation of the receive signal to the loop filter 43.

The loop filter 43 smoothes (or filters) the error signal supplied from the timing phase error detector 42 and supplies the smoothed error signal to the NCO 44.

To be more specific, the loop filter 43 is made up of multipliers 51 and 52, an integration circuit 53, and an adder 54. The integration circuit 53 is made up of an adder 55 and a delay element 56.

The error signal outputted from the timing phase error detector 42 is entered in the multipliers 51 and 52, which weight (or proportion-control) the error signal with coefficients preset to the multipliers 51 and 52, outputting the weighted error signals. The multiplier 51 outputs the weighted error signal to the adder 54 and the multiplier 52 supplies the weighted error signal to the adder 55 of the integration circuit 53.

In the integration circuit 53, the adder 55 adds the error signal from the multiplier 52 and the output (one symbol period before) of the adder 55 delayed by the delay element 56 and outputs an added result, thereby integrating the error signal outputted from the multiplier 52. The delay element 56 delays (or holds) the output from the adder 55 by one symbol period and supplies a resultant output to the adder 55. The integration circuit 53 supplies an integrated value of the error signal outputted from the multiplier 52 to the adder 54 and the lock detector 34.

The adder 54 adds the error signal supplied from the multiplier 51 and the integrated value of the error signal outputted from the integration circuit 53, thereby smoothing the error signal from the timing phase error detector 42. The adder 54 supplies the smoothed error signal to the NCO 44.

In accordance with the error signal supplied from the adder 54 of the loop filter 43, the NCO 44 controls the oscillation frequency of an error correction signal to be supplied to the interpolation filter 41, thereby generating an error correction signal of the oscillation frequency according to the error. For example, if the error signal supplied from the loop filter 43 is a positive value, the NCO 44 decreases the oscillation frequency of the error correction signal accordingly; if the error signal supplied from the loop filter 43 is a negative value, the NCO 44 increases the oscillation frequency of the error correction signal accordingly.

When an error correction signal such as described above is supplied to the interpolation filter 41, the timing of a frequency for sampling the receive signal is adjusted such that the timing deviation of the corrected receive signal is reduced in the interpolation filter 41.

The lock detector 34 is supplied with the integrated value of an error signal indicative of a timing deviation of the received signal from the integration circuit 53 of the loop filter 43. The lock detector 34 monitors the integrated value of the error signal and, on the basis of a predetermined threshold, determines whether the receive signal has been captured or not. If the receive signal is found captured, then the lock detector 34 supplies a lock signal indicative thereof to the signal processing circuit 33.

Figure 5:
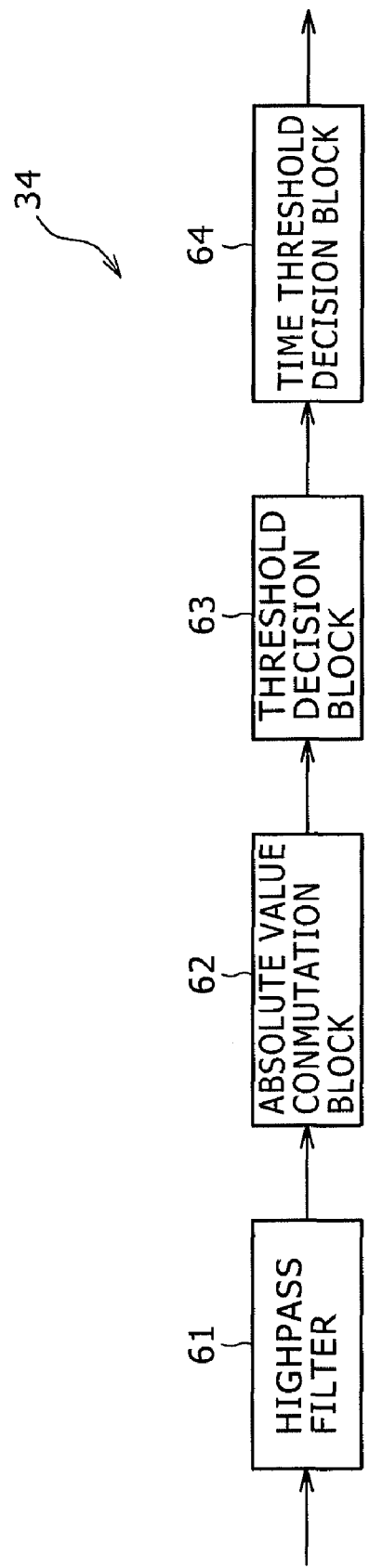
FIG. 5 is a block diagram illustrating an exemplary configuration of a lock detector.

Referring to FIG. 5, there is shown a block diagram of an exemplary configuration of the lock detector 34.

In FIG. 5, the lock detector 34 is made up of a highpass filter (HPF) 61, an absolute value computation block (ABS) 62, a threshold decision block 63, and a time threshold decision block 64.

The highpass filter 61 is supplied with a signal indicative of the integrated value of a timing error signal from the integration circuit 53 of the loop filter 43 and removes the low frequency component of the supplied signal to supply a signal above a predetermined frequency component to the absolute value computation block 62.

The absolute value computation block 62 computes an absolute value of the signal outputted from the highpass filter 61 and outputs a signal indicative of that absolute signal. Thus, the absolute value computed by the absolute value computation block 62 is indicative of a rate of change of the integrated value of a timing error signal. In what follows, the signal outputted from the absolute value computation block 62 will be referred to as a change rate signal from time to time.

A threshold is set to the threshold decision block 63 for determining whether, in converging of the variation of the integrated value of the timing error signal to a predetermined value, the value is converging or not. The threshold decision block 63 compares the change rate signal from the absolute value computation block 62 with the threshold and supplies a comparison result signal indicative of a result of the comparison to the time threshold decision block 64. Namely, if the variation rate signal is found to be equal to or above the threshold, the threshold decision block 63 supplies a comparison result signal indicative that the variation rate signal is above the predetermined threshold to the time threshold decision block 64; if the variation rate signal is found to be under the threshold, the threshold decision block 63 supplies a comparison result signal indicative that the variation rate signal is under the predetermined threshold to the time threshold decision block 64.

If the comparison result signal supplied from the threshold decision block 63 changes from a signal indicative that the variation rate signal is equal to or above the predetermined threshold to a signal indicative that the variation rate signal is under the predetermined threshold, the time threshold decision block 64 starts counting a period of time in which the variation rate signal is under the predetermined threshold. Then, if the variation rate signal is under the predetermined threshold during the predetermined threshold time, the time threshold decision block 64 outputs a clock signal indicative that the receive signal has been captured to the signal processing circuit 33.

If the comparison result signal supplied from the threshold decision block 63 changes from a signal indicative that the variation rate signal is under the predetermined threshold to a signal indicative that the variation rate signal is equal to or above the predetermined threshold before the expiration of the predetermined threshold time, the time threshold decision block 64 resets counting.

In the receiving apparatus 31 configured as described above, an error signal outputted from the timing phase error detector 42 is integrated by the integration circuit 53 and a signal indicative of a resultant integrated value is filtered by the highpass filter 61. Then, when the capture of the receive signal is detected on the basis of the variation rate signal indicative of the absolute value of the filtered signal, a lock signal indicative thereof is outputted.

The following describes signal variations in components of the receiving apparatus 31 shown in FIG. 4 and components of the lock detector 34 shown in FIG. 5, with reference to FIGS. 6A through 6E.

Figure 6A:
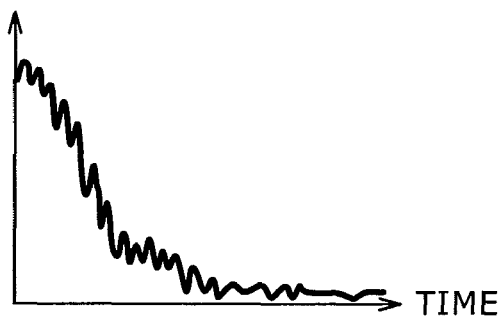
FIGS. 6A through 6E show signal variations in components of the receiving apparatus and components of the lock detector.
Figure 6B:
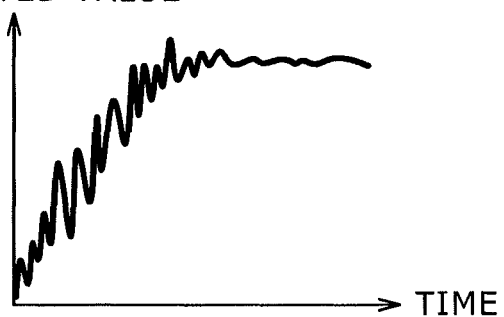
Figure 6C:
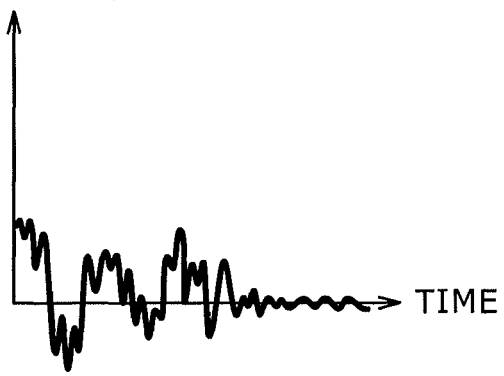
Figure 6D:
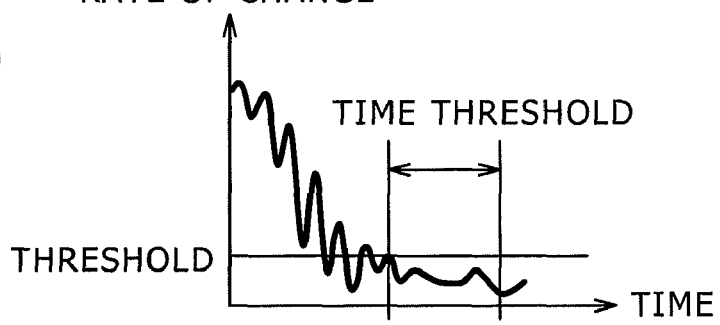
Figure 6E:

FIG. 6A shows an error signal that is outputted from the timing phase error detector 42 shown in FIG. 4. FIG. 6B shows a signal indicative of an integrated value that is outputted from the integration circuit 53. FIG. 6C shows a signal that is outputted from the highpass filter 61 shown in FIG. 5. FIG. 6D shows a variation rate signal that is outputted from the absolute value computation block 62. FIG. 6E shows a lock signal that is outputted from the time threshold decision block 64.

As shown in FIG. 6A, in the receiving apparatus 31, a receive signal is corrected by the timing correction circuit 32 and therefore the timing deviation of the receive signal is reduced, thereby converging an error signal to zero in accordance with this reduction. As shown in FIG. 6B, as the error signal converges to zero, an integrated value of the error signal gradually approaches a predetermined value. As shown in FIG. 6C, a signal outputted from the highpass filter 61 is indicative of only the high frequency component of the integrated value of the error signal.

The variation rate signal shown in FIG. 6D is the absolute value of the signal outputted from the highpass filter 61, so that this variation rate signal takes a positive value. When the timing error of an input signal is not converging, the value of the variation rate signal is relatively large, the integrated value thereof is relatively large, and the variation thereof is also relatively large. On the other hand, if the correction of the timing of an input signal is converging, the integrated value is relatively small and the variation thereof is relatively small.

Therefore, in consideration of this variation rate, the lock detector 34 compares the variation rate that is converging as shown in FIG. 6D with a predetermined threshold to determine whether the correction of the timing of an input signal is converging or not. For example, the time threshold decision block 64 counts the time in which the variation rate is under the threshold and, if the variation rate is under the threshold during the time threshold, outputs a lock signal indicative that the receive signal has been locked.

For example, the time threshold decision block 64 is outputting "0" indicative that the receive signal has not been locked as shown in FIG. 6E and outputs "1" indicative that the receive signal has been locked when the threshold time expires.

Figure 7:
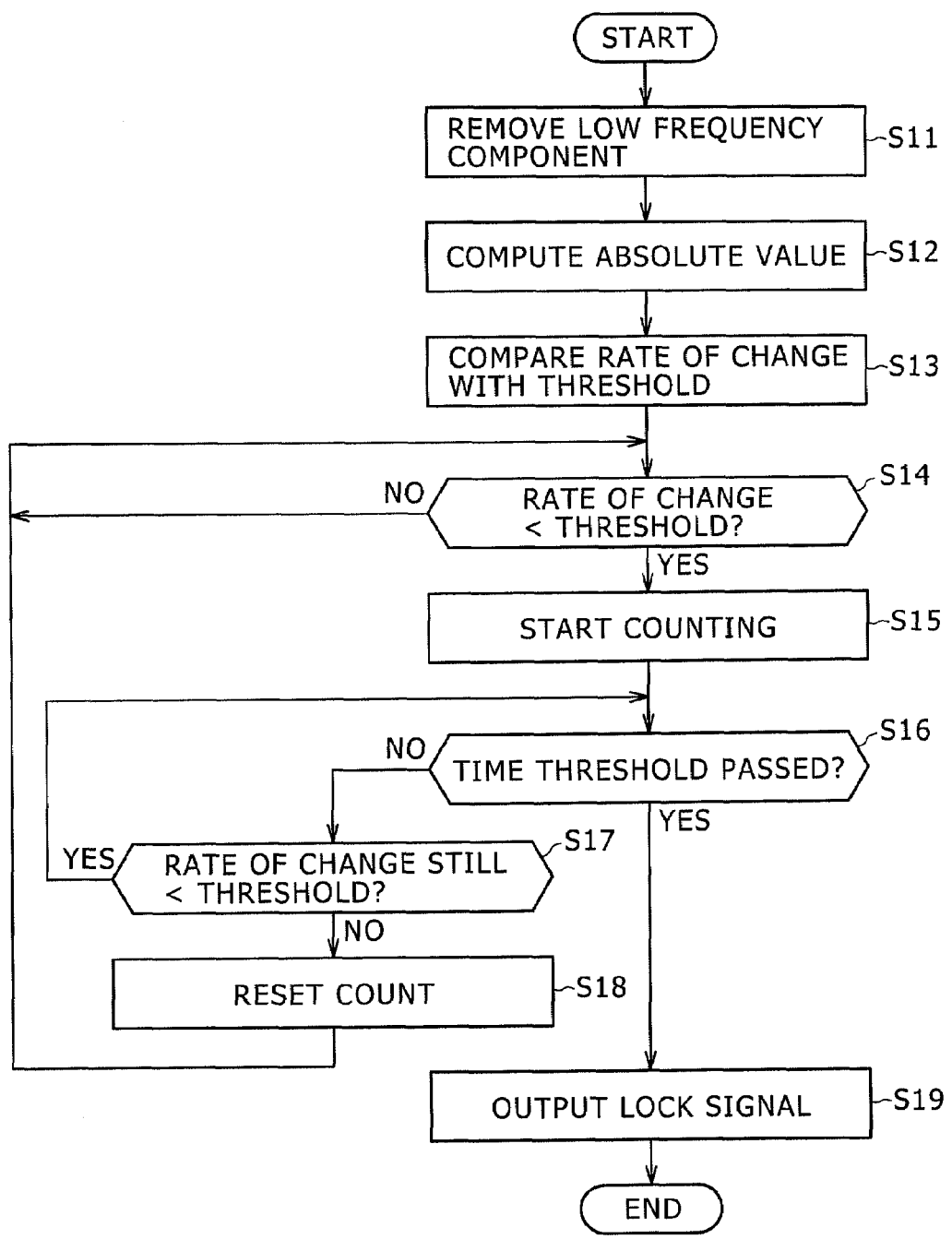
FIG. 7 is a flowchart indicative of processing in which the lock detector outputs a lock signal.

Referring to FIG. 7, there is shown a flowchart indicative of processing of outputting a lock signal that is executed by the lock detector 34 shown in FIG. 5.

When the timing correction circuit 32 starts the correction of a receive signal and the integration circuit 53 of the loop filter 43 supplies an integrated value of an error signal indicative of a timing deviation of the receive signal to the highpass filter 61 of the lock detector 34, the processing starts. In step S11, the highpass filter 61 removes the low frequency component of the integrated value of the error signal and supplies a resultant error signal to the absolute value computation block 62, upon which the procedure goes to step S12.

In step S12, the absolute value computation block 62 computes an absolute value of a signal that is outputted from the highpass filter 61 and supplies the computed absolute value to the threshold decision block 63.

After the processing of step S12, the procedure goes to step S13, in which the threshold decision block 63 compares a variation rate signal supplied from the absolute value computation block 62 in step S12 with a threshold. Then, the threshold decision block 63 sequentially supplies a comparison result signal indicative of a result of the comparison between the variation rate signal and the threshold to the time threshold decision block 64.

In step S14, on the basis of the comparison result signal supplied from the threshold decision block 63, the time threshold decision block 64 determines whether the variation rate signal is under the threshold or not. The processing waits until the variation rate signal is found under the threshold. If the variation rate signal is found under the threshold in step S14 by the time threshold decision block 64, then the procedure goes to step S15.

In step S15, the time threshold decision block 64 starts counting a time in which the variation rate signal is under the threshold.

After the processing of step S15, the procedure goes to step S16, in which the time threshold decision block 64 determines whether variation rate signals sequentially supplied from the threshold decision block 63 remain under the threshold or not.

In step S16, if the time threshold decision block 64 determines that the count value has not passed the time threshold, then the procedure goes to step S17, in which the time threshold decision block 64 determines whether the variation rate signal sequentially supplied from the threshold decision block 63 remains under the threshold or not.

If the time threshold decision block 64 determines in step S17 that the variation rate signal sequentially supplied from the threshold decision block 63 remains under the threshold, then the procedure goes to step S16 to repeat the above-mentioned processing.

On the other hand, if the time threshold decision block 64 determines in step S17 that the variation rate signal sequentially supplied from the threshold decision block 63 does not remain under the threshold, namely, the variation rate signal supplied from the threshold decision block 63 is equal to or above the threshold, then the procedure goes to step S18.

In step S18, the time threshold decision block 64 resets the count of the time in which the variation rate signal is under the threshold, namely, stops counting to set the count value to zero, upon which the procedure returns to step S14 to repeat the above-mentioned processing therefrom.

On the other hand, if the time threshold decision block 64 determines in step S16 that the count value has passed the time threshold, then the procedure goes to step S19. Namely, in this case, it indicates that the variation rate signal has been under the threshold during a predetermined threshold time.

In step S19, the time threshold decision block 64 supplies the lock signal indicative that the receive signal has been captured to the signal processing circuit 33, upon which the processing comes to an end.

As described above, in the receiving apparatus 31, the lock detector 34 outputs a lock signal depending on whether a variation rate signal has been under a predetermined threshold during a predetermined threshold time, so that the capture of the receive signal by the timing correction circuit 32 can be correctly detected.

Namely, in related-art receiving apparatuses for example, a lock detector thereof outputs a lock signal depending on whether a signal obtained by removing the high frequency component of an error signal gets under a predetermined threshold. With such a lock detector, fluctuations of the error signal are not taken into consideration, so that, if the error signal fluctuates, a lock signal may be outputted.

In contrast, with the lock detector 34, a lock signal is outputted depending on whether a variation rate signal remains under a predetermined threshold during a predetermined time threshold, so that the fluctuation of an error signal has not converged and, if the predetermined threshold is exceeded before the expiration of the time threshold, the count of time is reset. Namely, the lock detector 34 does not output a lock signal unless the fluctuation of an error signal converges. Therefore, the lock detector 34 can detect the capture of a receive signal more correctly than the related-art lock detector.

If a lock signal is outputted from the lock detector 34 while an error signal is still fluctuating, the signal processing circuit 33 in the subsequent stage retries the processing often because the receive signal is not stable. Consequently, the time for the receiving apparatus 31 to decode and output a receive signal is made relatively long.

In contrast, if the lock detector 34 outputs a lock signal after the convergence of the fluctuation, the number of retries in the signal processing circuit 33 becomes relatively less, thereby shortening the time for the demodulation and outputting of a receive signal as a whole in the receiving apparatus 31.

It should be noted that the receiving apparatus 31 shown in FIG. 4 is configured so as to supply a signal outputted from the integration circuit 53 of the loop filter 43 to the lock detector 34; however, it is also practicable to arrange an integration circuit for integrating error signals outputted from the timing phase error detector 42, for example, thereby supplying a signal from this integration circuit to the lock detector 34.

Figure 8:
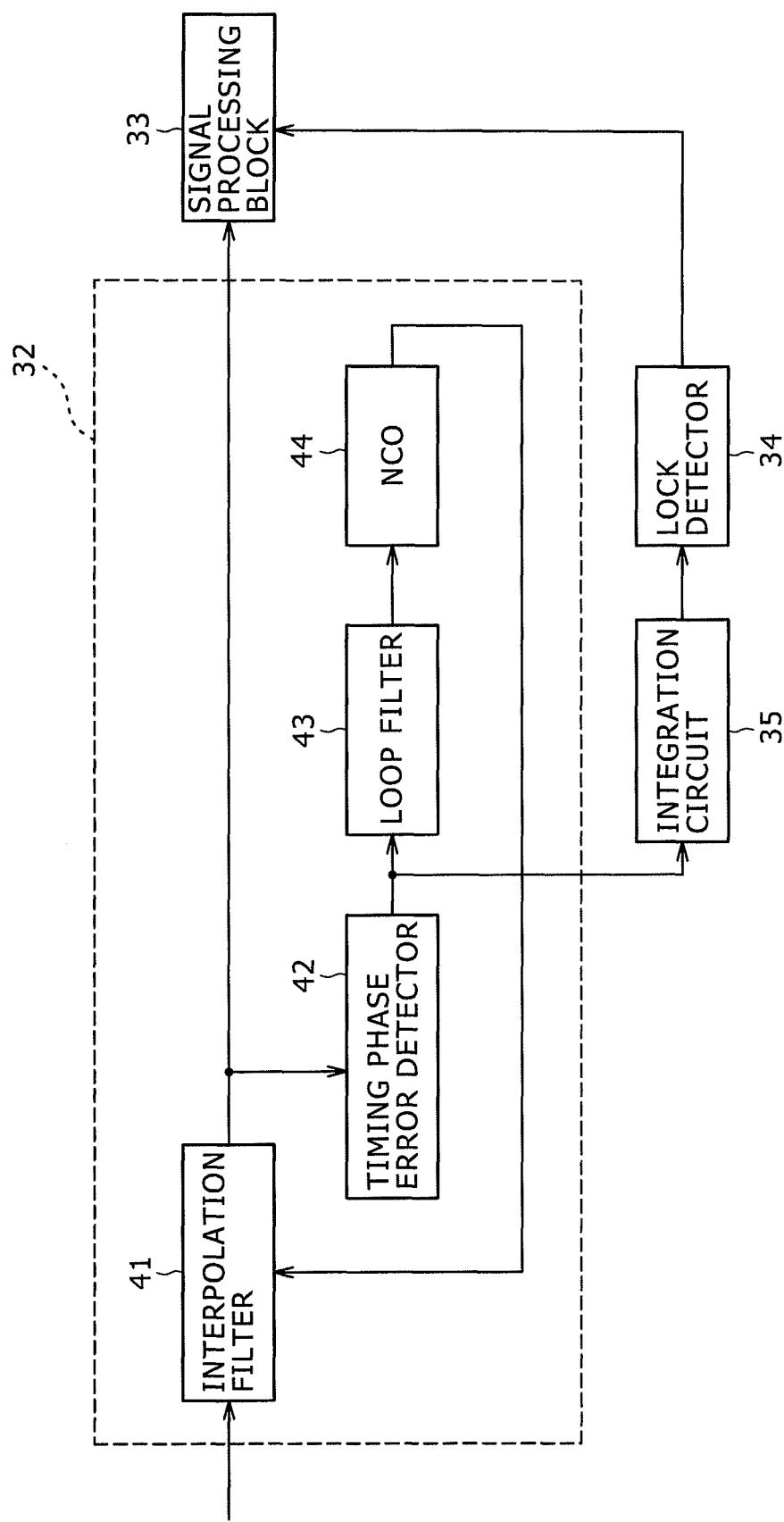
FIG. 8 is a block diagram illustrating an exemplary configuration of a receiving apparatus practiced as another embodiment of the invention.

Namely, referring to FIG. 8, there is shown a block diagram of an exemplary configuration of a receiving apparatus practiced as another embodiment of the invention.

With reference to FIG. 8, components similar to those previously described with reference to FIG. 4 are denoted by the same reference numerals and the description thereof will be omitted. It should be noted that the receiving apparatus shown in FIG. 8 has an integration circuit 35 configured to integrate error signals outputted from the timing phase error detector 42 and supply a resultant integrated value to the lock detector 34, which is a difference from the receiving apparatus 31 shown in FIG. 4.

As shown in FIG. 8, if the lock detector 34 executes the processing based on an integrated value supplied from the integration circuit 35, the capture of a receive signal can be correctly detected like the lock detector 34 shown in FIG. 4.

It should be noted that, in the present embodiments of the invention, the correction of timing is executed in the timing correction circuit 32; however, the correction executed in the correction circuit is not limited to timing correction. For example, a frequency correction block may be arranged instead of the interpolation filter 41 and a frequency error detector may be used instead of the timing phase error detector 42, thereby correcting the frequency of a receive signal. Further, for example, the embodiments of the present invention are applicable to AGC (Automatic Gain Control) for correcting the amplitude of a receive signal. Thus, in accordance with a subject of correction (timing, frequency, or amplitude), necessary an error detection section and a correction section may be used as required.

Also, the embodiments of the present invention may be applied to the processing for executing error correction aiming at a target (or an ideal state), such as timing correction, frequency correction, or amplitude correction. Applying the embodiments of the present invention to all of these processing operations allows the reduction of the capture time required for capturing a receive signal.

It should be noted that, in the embodiments of the present invention, the lock detector 34 executes threshold decision processing; however, it is also practicable to make a computer controlling components of the receiving apparatus 31 execute necessary software execute threshold decision processing.

Namely, the above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 9:
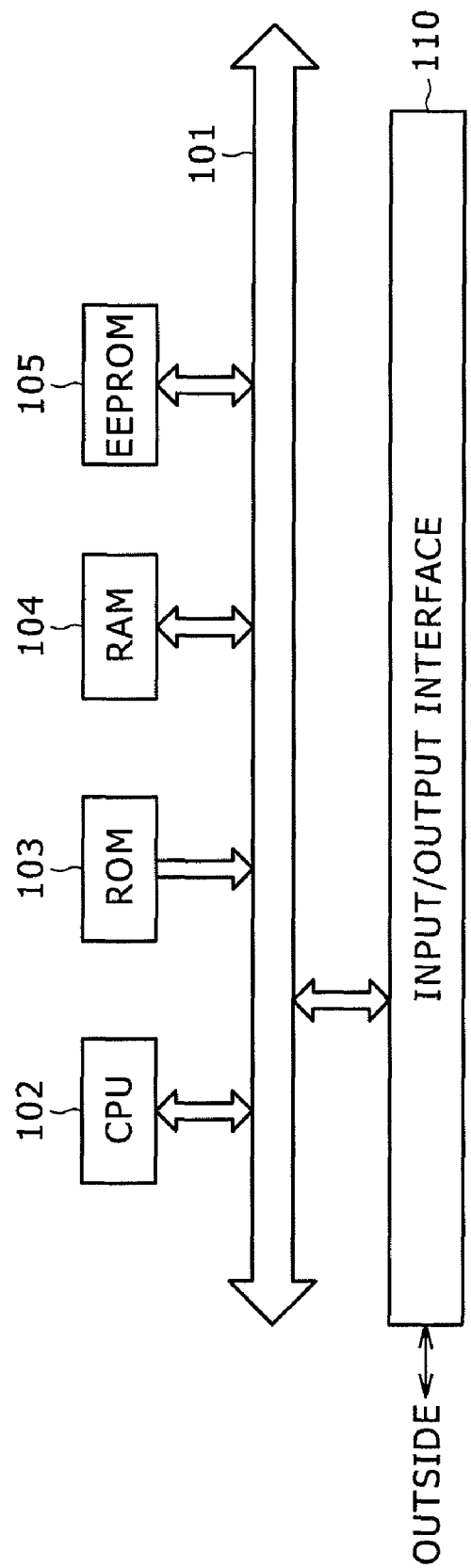
FIG. 9 is a block diagram illustrating a computer to which one embodiment of the present invention is applied.

FIG. 9 shows a block diagram of an exemplary hardware configuration of a computer (or a microcomputer) for executing the above-mentioned sequence of processing operations by software programs.

The software programs may be recorded beforehand to an EEPROM (Electrically Erasable Programmable Read-only Memory) 105 or a ROM 103 that are recording media incorporated in the computer.

Alternatively, the software programs may be provided by temporarily or permanently storing in removable recording media, such as a flexible disc, a CD-ROM (Compact Disc Read Only Memory), an MO (Magnetic Optical) disc, a DVD (Digital Versatile Disc), a magnetic disc, or a semiconductor memory, for example.

It should be noted that, in addition to the installation from the above-mentioned recording media into the computer, the software programs may be transmitted via a wired or wireless network to the computer, which receives the transmitted software programs by an input/output interface 110 and stores the received software programs into the incorporated EEPROM 105.

In the computer, a CPU (Central Processing Unit) (or a DSP (Digital Signal Processor)) 102, the ROM 103, a RAM (Random Access Memory) 104, the EEPROM 105, and the input/output interface 110 are interconnected via a bus 101.

The CPU 102 loads software programs stored in the ROM 103 or the EEPROM 105 into the RAM 104 and executes the loaded software programs therein. Consequently, the CPU 102 executes the processing in accordance with the above-mentioned flowcharts or the above-mentioned configurations shown in the block diagrams. It should be noted that the transfer of data to and from the outside the computer is executed via the input/output interface 110.

It should be noted that each software program to be executed by the computer may be a program that is executed in a time sequence along the order described herein or a program that is executed concurrently or on an on-demand basis.

It should be noted that each processing operation described with reference to the above-mentioned flowcharts may not always be executed in a time sequence along the order described as the flowcharts; therefore, the above-mentioned processing may include processing operations that are executed concurrently or discretely (for example, concurrent processing or object processing). Each software program may be executed by one CPU or by two or more CPUs in a distributed manner.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2008-154034, filed in the Japan Patent Office on Jun. 12, 2008, the entire content of which is hereby incorporated by reference.

What is claimed is:

1. A receiving apparatus comprising:
    capturing means for correcting an error of a received signal and for capturing the received signal;
    filtering means for removing a low frequency component of a signal indicative of an integrated value of an error of the received signal;
    capture detecting means for monitoring a signal output from the filtering means and, if the signal is within a predetermined range for a predetermined time, detecting that the capturing means has captured the received signal; and
    absolute value computing means for computing an absolute value of a signal output from the filtering means:
    wherein, if a signal output from the absolute value computing means is below a predetermined threshold for the predetermined time, the capture detecting means detects that the capturing means has captured the received signal.

2. The receiving apparatus according to claim 1, wherein the capturing means has
    correcting means for correcting an error of the received signal;
    error detecting means for detecting an error, relative to a predetermined reference signal, of a corrected signal output from the correcting means;
    smoothing means, having an integrator for integrating an error detected by the error detecting means, for smoothing the error; and
    error correction signal generating means for generating an error correction signal indicative of a correction amount of the error on the basis of the error smoothed by the smoothing means;
    the filtering means being supplied with a signal output from the integrator of the smoothing means.

3. The receiving apparatus according to claim 2, further comprising:
    integrating means for integrating an error output from the error detecting means of the capturing means;
    wherein the filtering means is supplied with a signal output from the integrating means.

4. A receiving method for a receiving apparatus configured to receive a signal, comprising the steps of:
    correcting an error of a received signal and capturing the received signal;
    removing a low frequency component of a signal indicative of an integrated value of an error of the received signal;
    monitoring a signal output from the filtering step and, if the signal is within a predetermined range for a predetermined time, detecting that the capturing step has captured the received signal; and
    computing an absolute value of a signal output from the filtering step;
    wherein, if a signal output from the absolute value computing step is below a predetermined threshold for the predetermined time, determining that the capture detecting step detects that the received signal has been captured.

5. A program embodied on a non-transitory computer readable medium for making a computer control a receiving apparatus for receiving a signal, comprising the steps of:
    correcting an error of a received signal and capturing the received signal;
    removing a low frequency component of a signal indicative of an integrated value of an error of the received signal;
    monitoring a signal output from the filtering step and, if the signal is within a predetermined range for a predetermined time, detecting that the capturing step has captured the received signal; and
    computing an absolute value of a signal output from the filtering step;
    wherein, if a signal output from the absolute value computing step is below a predetermined threshold for the predetermined time, determining the capture detecting step detects that the received signal is captured.

6. A receiving apparatus comprising:
a capturing section configured to correct an error of a received signal and to capture the received signal;
a filtering section configured to remove a low frequency component of a signal indicative of an integrated value of an error of the received signal;
a capture detecting section configured to monitor a signal output from the filtering section and, if the signal is within a predetermined range for a predetermined time, detecting that the capturing section has captured the received signal; and
absolute value computing section configured to compute an absolute value of a signal output from the filtering section;
wherein, if a signal output from the absolute value computing section is below a predetermined threshold for the predetermined time, the capture detecting section detects that the capturing section has captured the received signal.

* * * * *